US005245183A

United States Patent [19]

Anderson et al.

[11] Patent Number: 5,245,183

[45] Date of Patent: Sep. 14, 1993

[54] VIBRATION RESISTANT COAXIAL INFRARED DIODE AND INTEGRATED CIRCUIT BOARD

[75] Inventors: Thomas G. Anderson, Springfield; Henry G. Kling, Stafford, both of Va.

[73] Assignee: The United States of America as represented by the Secretary of the Army, Washington, D.C.

[21] Appl. No.: 942,894

[22] Filed: Sep. 10, 1992

[51] Int. Cl.$^5$ ................ G02B 7/00

[52] U.S. Cl. ................ 250/239; 359/894

[58] Field of Search ................ 250/239, 227.24, 216; 359/894

[56] References Cited

U.S. PATENT DOCUMENTS

| | | | |
|---|---|---|---|
| 4,461,538 | 7/1984 | Breed et al. | 250/227.24 |
| 4,568,826 | 2/1986 | Pitel et al. | 250/239 |
| 4,758,767 | 7/1988 | Blake | 250/239 |
| 5,115,129 | 5/1992 | Johnson | 250/239 |
| 5,138,156 | 8/1992 | Lee | 250/239 |

*Primary Examiner*—David C. Nelms
*Assistant Examiner*—John R. Lee
*Attorney, Agent, or Firm*—Milton W. Lee; John E. Holford; Anthony T. Lane

[57] ABSTRACT

For an optical sensor having a cylindrical housing and mounted on the housing axis, a mounting plug which carries a detector diode and detector amlifier, threadedly engages the housing, and temporarily engages a removeable adjusting tool.

3 Claims, 3 Drawing Sheets

VIBRATION RESISTANT COAXIAL INFRARED DIODE AND INTEGRATED CIRCUIT BOARD

BACKGROUND OF THE INVENTION

1. Field of the Invention

The present invention generally relates to photodetector mountings for special telescopic gun sights, and more specifically, to sights mounted in high vibration environments, such as in helicopters.

2. Description of Prior Art

The Army's helicopter gunships include camera systems boresighted with one or more of their guns to determine their overall effectiveness and provide a permanent record of damage to specific targets. To provide special optical sights for these guns, the film carrier in the camera system can be temporarily replaced by a gimbal mounted detector. The camera optics, which remain firmly mounted to the helicopter, are used by the special sight to focus a target image on the detector. This arrangement is described in U.S. Pat. No. 5,138,156 entitled "Vibration Tolerant Boresight Mechanism" by John E. Lee, et al., to issue on Aug. 11, 1992.

The detector is mounted on the axis of a circularly cylindric housing and this housing axis is aligned with the optical axis of the camera optics by means of the gimbal mounting. A coaxial cable is connected to the detector to supply dc power to the detector, if needed, and to transmit detector signals to an external amplifier. The housing has circular end walls with center apertures to admit the cable at one end and the radiation from the camera optics at the opposite end. The detector and its cable are moved axially within the housing to place the light sensitive surface of the detector at the focal plane of the camera optics.

While this arrangement solved some of the mechanical problems of shock and vibration, the external amplifier proved to be electrically noisy and, since it had no mounting was poorly protected. Since the amplifier was designed specifically for use with this particular detector and aircraft, no off-the-shelf solution is available.

What is needed in this instance is a simpler detector and amplifier combination to eliminate the source of noise between the detector and amplifier and to provide better protection for the amplifier.

SUMMARY OF THE INVENTION

It is therefore one object of the invention to provide a combined detector and amplifier with rigid coupling therebetween and a sturdy common housing shield.

It is another object of the present invention to provide a more precise means for aligning the light sensitive surface of the detector with the focal plane of the camera optics.

According to the invention, the detector and amplifier are combined into a sturdy common structure and integrated with a common housing, so as to provide a simple focussing adjustment during assembly and a highly vibration resistant unit upon completion.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
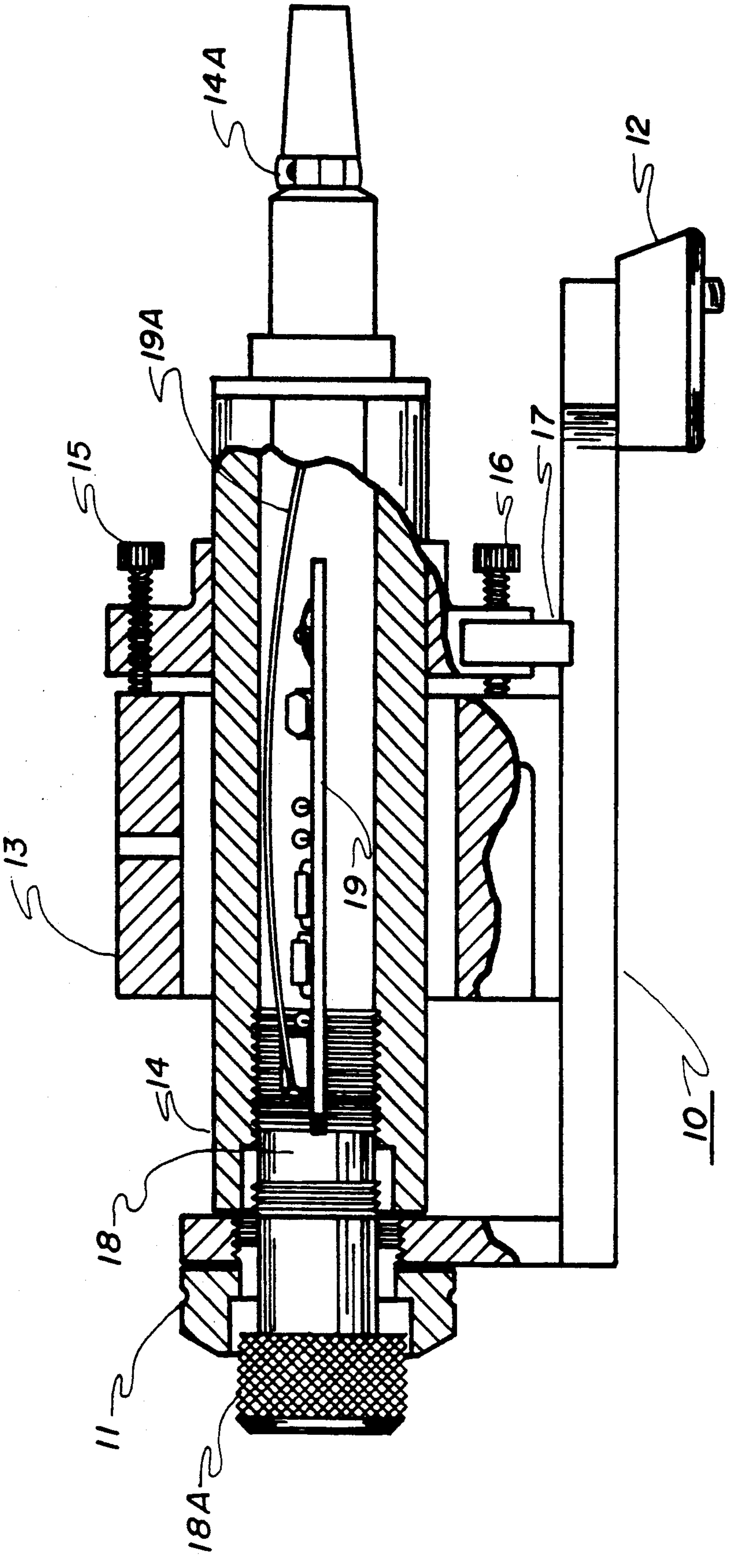
FIG. 1 shows a cutaway view of an entire telescopic sight assembly with adapters to match the surface areas of the film magazine used in the aerial gun cameras on the Army's Cobra helicopter.

Referring now to the drawings, and more particularly to FIG. 1, there is shown a complete embodiment of the telescopic aerial sight according to the present invention. The sight is assembled on a base member 10 which includes a hollow cylindrical projection 11 to engage a mating opening in the optic system of a Cobra helicopter and foot member 12 which engages a mating ledge of the helicopter for complete support. The base is fastened to a yoke 13 that can rotate slightly about an axis normal to the base. A hollow cylindrical housing 14 include external axles normal to the plane of view at the center thereof and journalled into the yoke. The yoke is dimensioned to place the center of mass of the housing, which lies on the housing axis, on the optical axis of the helicopter optics. The rotational adjustments provided above permit the sight's housing axis to be aligned with the optical axis, which is in turn aligned with the bore axis of the helicopters guns. Set screws, and adjusting screws like screws 15 and 16 are strategically placed and tightened to maintain elevation alignment. Projections on opposite sides of the base like projection 17 are threaded to receive screws similar to screws 15 and 16 to permit azimuth adjustments.

The radiation detector for the sight was originally located on the housing centered on the housing axis at the front of the housing. In the present invention this detector is mounted in a support plug 18, attached to the housing; and a circuit board amplifier 19 is also mounted to the support plug, whereas this amplifier was formerly a separate element located outside of the housing. The circuit board is rectangular with a width slightly less than the inside diameter of the housing and a length approximately equal to spacing of the fully inserted plug from the inside end of the housing. A cable 19A with a plurality of conductors is electrically connected at one end to the circuit board. The board is also electrically connected to the support plug and detector diode, so that dc power from a remote source can be applied to the amplifier and processed signals generated by the detector can be extracted. For stability the cable may be clamped or taped to the circuit board of the amplifier.

After the support plug is positioned in the housing and adjusted to place the input surface of the detector diode in the plane of the optical system, an integral clamp 14A at the rear end of the housing is tightened to provide stain relief for the cable terminations.

Figure 3:
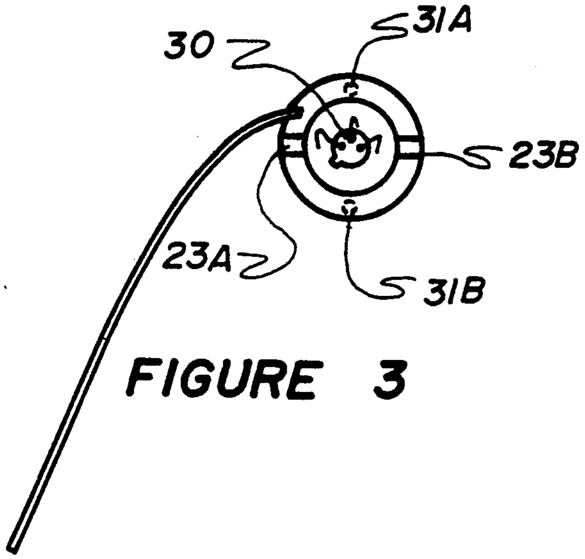
FIG. 3 shows an axial view of the support plug as seen from inside the cylindrical sight housing.
Figure 2:
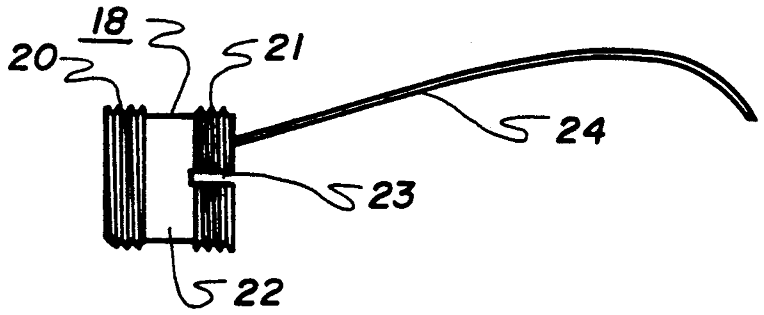
FIG. 2 shows aside view of the support plug.

As shown in FIG. 2 the support plug 18, which is made of conductive metal, is a cup shaped member with a hole centered in the bottom or washer shaped end wall to receive the detector and a cylindrical outside wall with threaded portions 20 and 21 at the top and bottom. The center portion 22 of the outside wall is relieved slightly below the depth of the threads to minimize friction and possible thread interference during assembly and adjustment. Diametrically oriented slots like slot 23 are sawed into the open end of the cup parallel to the axis to accommodate the edge of the amplifier circuit board. A small diameter hole is drilled into this same end between the slots to receive a ground wire 24 from the input cable which is soldered in place. As shown in FIG. 3 the detector diode 30 is inserted through the open end of the cup and press-fitted, soldered or epoxied, using conductive epoxy, into the opening in the apertured bottom end of the cup. Two small holes 31A and 31B, shown in phantom view, are drilled through the bottom wall into the center of the cylindrical side wall of the cup in diametrically opposed relationship midway between slots 23A and 23B to accommodate two fingers in an adjustment tool.

Figure 4:
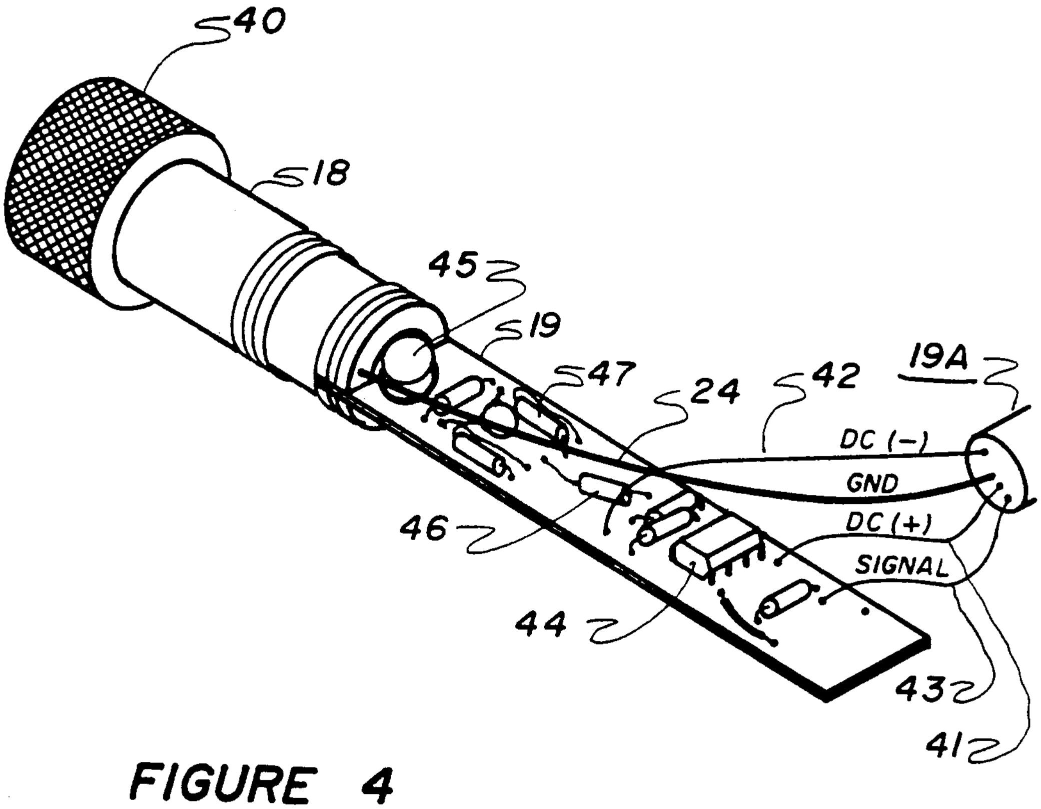
FIG. 4 shows an isometric view of an internal amplifier board and support plug mounted in the cylindrical housing of the telescopic sight as modified by the present invention.

As shown in FIG. 4 one end of the circuit board 19 is inserted into the slots provided in the open end of the cup shaped support member 18 and an adjustment tool is mounted on the detector end. As usual the circuit board has copper interconnections bonded to its surface to which are soldered wires from cable 19A such as a dc+ wire 41, a dc− wire 42 and a signal output wire 43. Also soldered on this board are elements such as an integrated circuit preamplifier 44, post amplifier 45, resistors such as element 46 and capacitors like element 47. The ground electrode on the circuit board extends into the slot in support plug 18 and is soldered thereto, thus providing a vibration safe return through conductor 24.

Figure 5:
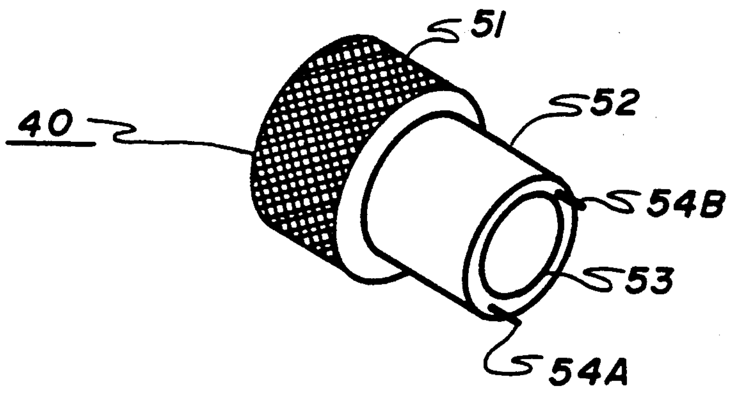
FIG. 5 shows an isometric view of the plug support with the amplifier attached and a special tool for inserting the support plug in the sight housing.

As shown in FIG. 5 the adjusting tool 40 has a knurled head 51 which is twisted manually to as the support plug is inserted to obtain precise placement of the detector its housing. A reduced diameter stem portion 52, substantially equal to diameter of the center portion 22 of the support plug, extends axially from the head 51. The stem portion has a hollow well 53 to provide a wall thickness also substantially equal to the center section of the support plug and thus avoid contact with the detector diode. The end of the stem is drilled to provide two diametrically opposed holes into which are soldered wire fingers 54A and 54b which mate with holes 31A and 32B previously described. Once the support plug is adjusted and cable clamp 14A tightened the tool is removed and remaining assembly is attached to the aircraft. The distance from front edge of the housing to the active surface of the detector can be checked with a standard depth gauge to determine the proper positioning of support plug.

While this invention has been described in terms of preferred embodiment consisting of a specific support plug and adjustment tool, those skilled in the art will recognize that the invention can be practiced with modification within the spirit and scope of the appended claims.

Having thus described my invention, what I claim as new and desire to secure by letters patent is as follows:

1. In an optical sensing system wherein an optical detector is mounted in a rigid circularly cylindrical housing member and axially adjusted to the focal plane of an external optical system having a fixed relationship to said housing; the improvement comprising:

a circularly cylindrical cup shaped support plug threaded into said housing for incremental axial adjustment, said plug having an open end and a circular end wall opposite said open end;

said detector being axially bonded through the center of the circular end wall of said plug;

said plug having diametrically opposed axial slots in its cylindrical wall opening out of the open end thereof;

an amplifier on a long narrow rectangular circuit board bonded in said slots such that the long axis of said circuit board coincides with the axis of said plug.

2. A sensing system according to claim 1 wherein:

the external surface of said circular end wall is configured to engage an adjusting tool to rotate said plug inside said housing.

3. A sensing system according to claim 2 wherein:

said adjustment tool includes a knurled head portion;

a hollow stem extending into said housing to contact said plug without touching said diode, said stem having substantially the same minimum outer and maximum inner diameters as said plug; and a pair of diametrically opposed axially parallel pins attached to the end of said stem engaging mating apertures in said plug.

* * * * *